March 21, 1933.  P. ELBOGEN  1,902,627
MOLD AND METHOD OF MAKING THE SAME
Filed July 5, 1932
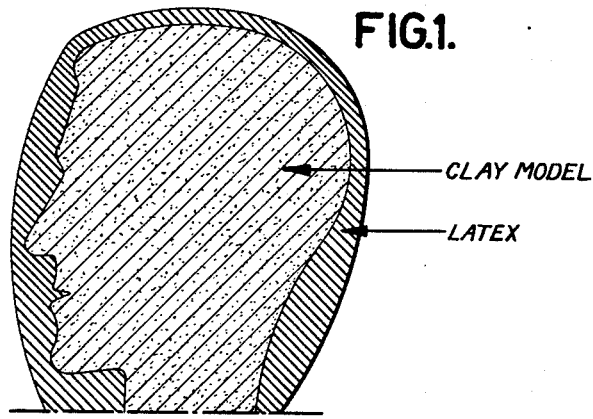
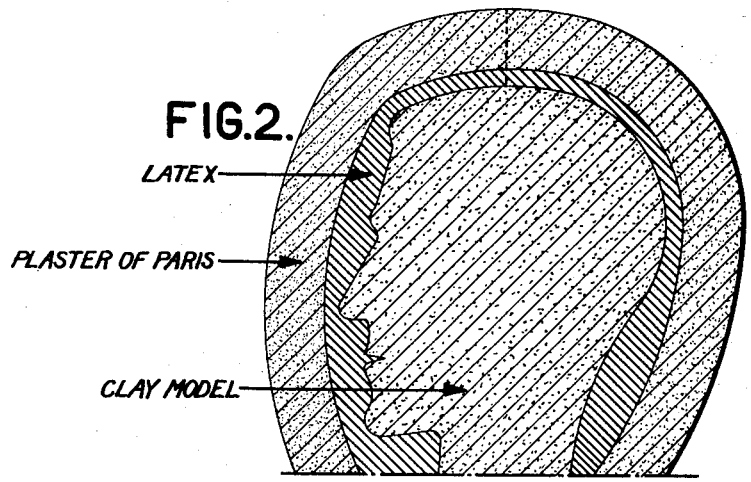
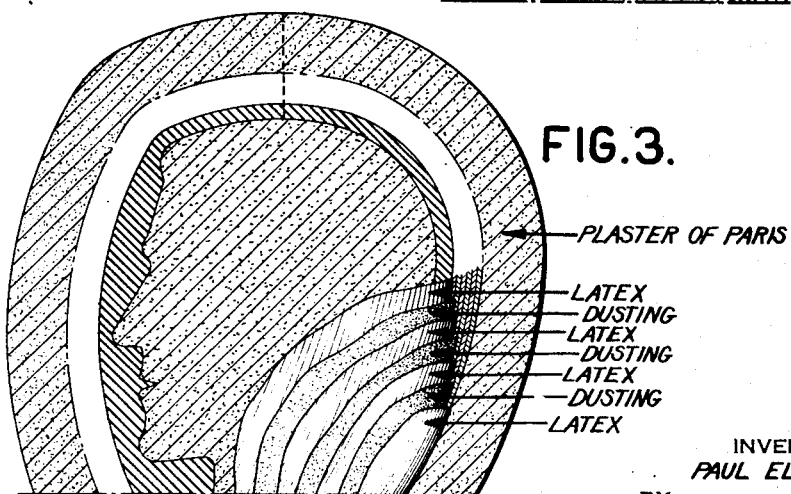
INVENTOR
*PAUL ELBOGEN*
BY
*Cooper, Kerr & Dunham*
ATTORNEYS Patented Mar. 21, 1933

1,902,627

UNITED STATES PATENT OFFICE

PAUL ELBOGEN, OF MOUNT KISCO, NEW YORK, ASSIGNOR OF ONE-THIRD TO GEORGE D. KRATZ, OF SCARSDALE, NEW YORK

MOLD AND METHOD OF MAKING THE SAME

Application filed July 5, 1932. Serial No. 620,797.

This invention relates to improvements in molds and to an improved composition for use in making molds and to an improved method for making matrix molds which are used for the reproduction of objects of identical shape.

The improved composition matrix mold and method are particularly applicable for the mechanical and intricate objects made initially by hand and which are desired to be reproduced as exact duplicates of the original model.

As an illustration, one use of the invention in the sculptural arts, it is the usual practice to initially form the object or pattern model in clay or other plastic material which can be readily fashioned and molded by hand into the desired shape. After the object or pattern model is completed a plaster of Paris matrix is sometimes taken directly from the clay model and such matrix is utilized as a mold for the casting of reproductions. In certain other cases when the original model has a complicated configuration with undercut portions, a different procedure is followed. The clay model is made in the usual way and a case of plaster of Paris or clay or some such similar material is built up and spaced slightly from the clay model. Then into the intervening space, gelatin or like material is poured and allowed to set. After the gelatin or like material has set, the case is cut into halves or smaller sections and the gelatin is removed in sections from the pattern model. Frequently the gelatin material has to be cut into a considerable number of section in order to remove it from the clay pattern model. This procedure is difficult and time consuming since the gelatin is quite fragile. After the gelatin has been removed from the clay model it is reassembled in the casing to form a matrix mold, the interior of the gelatin having a configuration to correspond with the original clay model. Into this matrix mold, thus formed, is poured a fresh mixture of plaster of Paris and water which mixture is allowed to set and harden. The outer case is now carefully chipped away, the gelatin is removed and the inner piece of molded gypsum or cast is then available for any desired use as a reproduction of the original clay model.

The making of reproductions or casts by the above method is quite tedious and requires considerable skill. The difficulties are increased in the cases where the gelatin mold has to be removed from the clay model in a considerable number of pieces. Frequently, the original clay model is destroyed in this operation, the gelatin matrices frequently break and the gelatin mold does not lend itself to the making of many reproductions.

The present invention has for its objects the provision of new composition adaptable for use in the making of molds, the provision of an improved method of making molds and an improved method of making casts of articles which are to be reproduced in quantity.

A further object of the present invention resides in the provisions of an improved mold which comprises a flexible inner matrix portion and outer portions which are relatively more rigid than the inner portion and which are bonded thereto.

The drawing shows several embodiments of the present invention. In the drawing, Figure 1 shows an embodiment wherein latex is employed over a clay model; Fig. 2 shows a different embodiment wherein the latex is backed up by a plaster of Paris casing; Fig. 3 shows another embodiment with a model covered by latex backed up by alternate layers of latex and a dusting material and finally backed up by a plaster of Paris casing or jacket.

According to the present invention in lieu of utilizing gelatin, glue or the like to cover the original clay or other pattern model, I utilize solutions of rubber latex, or compounded solution of rubber latex. Preferably with such latex solutions I also utilize plaster of Paris or an equivalent substance which is adapted to set to a hard mass by the adding of water thereto.

In practicing my invention (see Fig. 1) I make the initial pattern model of the desired shape of some suitable plastic substance such as clay. The completed pattern model is then repeatedly coated, dipped or sprayed with a latex solution. After each coating operation, the solution is allowed to dry before the next coat is applied, or if desired after each coat, the whole may be sprayed with acetic acid, ethyl alcohol or any other coagulant for the latex. The coating process is continued until the desired thickness of flexible rubber has been obtained around the original pattern object. The rubber is allowed to dry and it is then removed from the clay model. In many cases the rubber matrix mold can be stripped off in one piece, the rubber stretching to permit the removal of the matrix mold from the clay model. In other cases the rubber mold may be cut open on one side or into two or more parts and if necessary the clay model can be washed out, thereafter the matrix parts of the rubber mold are reassembled. In certain cases where a more permanent mold is desired, the rubber matrix may be covered with a plaster of Paris casing, which casing or outer backing portion can be split into two or more sections as desired (see Fig. 2). This rubber matrix mold can then be utilized for the direct casting of reproductions therein. By proceeding in this manner an accurate indestructable mold is prepared from which a large number of plaster casts can be made in the regular way.

In carrying out the above procedure and wherever possible, I find that best results are obtained by dipping the clay model in a latex solution of from 60% to 70% rubber concentration by weight. Furthermore if considerable rigidity is desired in the ultimate mold the latex solution should be compounded for vulcanization and the rubber mold vulcanized either before or after its removal from the clay model and/or a plaster of Paris mold fitted around the rubber matrix mold. If the rubber is to be subsequently vulcanized a solution of the following general type should be prepared:

| | Parts by weight |
|---|---|
| Latex, rubber in solution | 100 |
| Sulphur | 2 |
| Zinc oxide | 2.5 |
| Stearic acid | 1.0 |
| Agerite white | 1.0 |
| Zimale | 0.5 |
| Captax | 1.0 |
| Ammonium alginate | 0.25 |

In the foregoing composition, agerite white is sym-di-beta-naphthyl-para-phenylene-diamine and zimale is zinc-dimethyl-dithiocarbamate and captax is mecaptobenzothiazole.

Matrix molds prepared as above and with the above compound may be vulcanized by any approved method of hot vulcanization in about fifteen minutes at a temperature of 200° F.

In practicing the present invention, advantage may also be taken of the property of plaster of Paris or other anhydrous substance to readily take up water of crystallization and such water of crystallization to be taken up by the plaster of Paris can be derived from the aqueous constituent of the latex whereby the matrix mold upon hardening or setting forms a composition which combines the characteristics of both gypsum and rubber.

When gypsum is heated in an oven to a temperature not to exceed 127° C. it loses two molecules of water and forms the anhydrous compound known as plaster of Paris. Thus

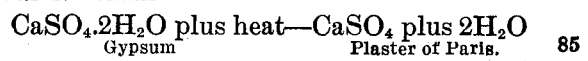
$$\underset{\text{Gypsum}}{CaSO_4.2H_2O} \text{ plus heat} — \underset{\text{Plaster of Paris.}}{CaSO_4} \text{ plus } 2H_2O$$

This action is reversible in that plaster of Paris and water recombine in accordance with the above equation to form hard gypsum.

It has been found that plaster of Paris when mixed with latex solutions will utilize the water in the latex solution in the manner just described and set to a homogeneous mass of gypsum and rubber, which mass has some of the characteristics of each component. By varying the amounts and proportions of latex and plaster of Paris which are employed, the final mold product in characteristics may vary from a hard and almost inflexible solid to a highly rubbery and flexible composition admirably adapted for the matrix surface of the mold.

When latex and plaster of Paris are to be used together I proceed as heretofore described, making first the clay model of the desired object. This clay model is then successively coated with the latex solution as previously described until the desired thickness of rubber has been deposited upon the clay model as shown in Fig. 2. A further coating of latex is then applied and while this coating is still wet the entire model is dusted thoroughly with plaster of Paris (see Fig. 3). When the plaster of Paris is partially set and water withdrawn from the underlying wet latex coating the entire model is resprayed with latex and again redusted with plaster of Paris. This operation is repeated as many times as is necessary to form a mold wherein there is a gradual transition from the rubber inner matrix portion of the mold to the more outermost parts which comprise a mixture which is composed of latex and rubber. After the desired number of layers of rubber and plaster of Paris have been applied the whole is then covered with a mixture of plaster of Paris and water and allowed to set to a permanent hardness.

A mold made in the above manner has an inner lining which is substantially pure rubber and which is quite flexible. This inner lining is solidly bonded to the gypsum and the quantity of gypsum increases and the quantity of rubber decreases progressively in the layers toward the outside of the mold.

After the composite mold has been completed, it is cut into two or more pieces. The clay pattern is then removed and a perfect rubber matrix mold is provided firmly embedded in gypsum. Such molds can be used in the usual way to make casts and it is found that an almost indefinite number of casts can be made from the mold without destroying either its accuracy or efficiency. If desired, a coating of oil or grease may be applied to the surface of the mold to facilitate the removal of the plaster cast.

While vulcanization of the final mold is not essential in some cases it may be desirable. When vulcanization is desired in place of utilizing untreated latex solution, a compound solution of the type previously described may be utilized in the same manner and the composite rubber and gypsum mold subjected to heat with the resulting vulcanization of the rubber.

While the new molding composition and method is of utility in the sculptural arts, it is also useful in the making of molds of fragile substance or of products having low melting points. For example, an exact reproduction of candy forms has been difficult to secure due to the nature of the substance. According to the present invention the candy may be successively sprayed with latex, dusted with plaster of Paris and finally covered with a mixture of plaster of Paris and water. The candy can then be washed out or otherwise removed and an accurate cast mold which is firmly embedded in gypsum results.

What I claim is:

1. A mold for the casting of articles having an inner matrix portion and outerly backing portions, said inner matrix being formed principally of rubber derived from rubber latex and the more outerly portions of the mold comprising laminated layers of gypsum alternating with rubber.

2. The invention set forth in claim 1 in which the gypsum predominates in the outerly laminated portions of the mold.

3. A mold comprising a flexible matrix portion and an outerly portion for backing up the flexible matrix portion, said inner matrix portion being comprised principally of rubber and the outerly portion including laminated layers of plaster of Paris and latex with the plaster of Paris converted into gypsum by the water derived from the latex layers.

4. The method of making a matrix mold which comprises coating a pattern with rubber latex to build up a desired thickness for the flexible matrix portion of the mold, thereafter applying plaster of Paris to an underlying wet latex coating, causing said plaster of Paris to set into gypsum by absorbing moisture from the latex solution and repeating the coating of the mold with alternate coatings of latex solution and plaster of Paris until the desired thickness is obtained.

5. The method of making a mold and providing a flexible matrix portion and a relatively more rigid backing up portion which is bonded to the matrix portion, which comprises the dipping of a pattern into rubber latex, setting said latex coating and repeating the dipping and setting until the flexible inner matrix portion is of requisite thickness, then dusting upon a wet coating of latex, plaster of Paris and causing the setting of the plaster of Paris into gypsum by the withdrawal of water from the latex coating.

6. The invention set forth in claim 5 which includes the steps of alternately applying latex solution and plaster of Paris, and in setting each plaster of Paris coating into gypsum by the water derived from the adjacent latex coating.

7. The invention set forth in claim 6 which includes steps of applying relatively greater proportions of plaster of Paris upon the more outerly portions of the mold to provide increased hardness and rigidity for the outerly portions of the mold.

8. A mold for casting articles comprising an inner flexible portion of rubber formed from latex, an outermost portion which is substantially all gypsum and intermediate layers of gypsum and rubber with the rubber increasingly predominating as the layers approach the inner flexible rubber portion and with the gypsum increasingly predominating as the layers approach the outermost gypsum layers.

9. The method of making a mold which comprises providing a flexible inner matrix portion by dipping and redipping a pattern in latex solution, causing the setting of the successive coatings of latex, then applying to wet latex coatings plaster of Paris, and setting the plaster of Paris into gypsum by water from the latex.

10. A mold for the casting of articles having an inner matrix portion and an outerly backing portion, said inner matrix portion being formed of rubber derived from rubber latex and said backing portion being comprised of plaster of Paris.

In testimony whereof I hereto affix my signature.

PAUL ELBOGEN.

CERTIIFICATE OF CORRECTION.

Patent No. 1,902,627.  March 21, 1933.

PAUL ELBOGEN.

It is hereby certified that error appears in the printed specification of the above numbered patent requiring correction as follows: Page 3, line 95, claim 7, for the numeral "6" read "5"; and that the said Letters Patent should be read with this correction therein that the same may conform to the record of the case in the Patent Office.

Signed and sealed this 9th day of May, A. D. 1933.

M. J. Moore.

(Seal)  Acting Commissioner of Patents.